United States Patent [19]

Von Holten

[11] Patent Number: 4,478,369

[45] Date of Patent: Oct. 23, 1984

[54] APPARATUS FOR SPREADING GRANULAR MATERIAL

[75] Inventor: Hubert B. Von Holten, Lafayette, Ind.

[73] Assignee: Hawk Eye, Inc., Lafayette, Ind.

[21] Appl. No.: 462,884

[22] Filed: Feb. 1, 1983

[51] Int. Cl.³ .............................................. A01C 15/00
[52] U.S. Cl. .................................... 239/664; 239/672; 239/674
[58] Field of Search ............... 239/664, 655, 672, 674; 222/415, 622

[56] References Cited

U.S. PATENT DOCUMENTS 2,538,961  1/1951  Biszantz ............................... 239/664
4,174,813  11/1979  Grataloup ........................... 239/664

Primary Examiner—John J. Love
Assistant Examiner—James R. Moon, Jr.
Attorney, Agent, or Firm—John R. Nesbitt

[57] ABSTRACT

Granular spreader apparatus for easy attachment to, and detachment from, a truck equipped with a hopper bed, including dual troughs that each house a continuous conveyor belt that overlies a slotted trough which permits granular material of dissimiliar size and weight, such as fertilizer, herbicide, limestone, and other agricultural particulates of dissimiliar size and weight, to be substantially uniformly distributed from the initial point of deposit at the inboard end of the conveyor belt to the outboard extremity of the conveyor belt.

6 Claims, 9 Drawing Figures

APPARATUS FOR SPREADING GRANULAR MATERIAL

FIELD OF THE INVENTION

This invention relates to granular spreader apparatus for attachment and detachment to a hopper truck, and more particularly to such a device that uses laterally disposable troughs each having a conveyor belt with a controlled discharge means extending between the inner and outer extremity thereof.

BACKGROUND OF THE INVENTION

Since after the Second World War, as mechanized agriculture has increasingly become common in the United States, many different types of granular materials have increasingly been applied to farm fields to assist in crop production. The more common types of such granular material would include various formulations of N (nitrogen) - P (phosphate) - K (potash) combinations that are usally denoted by their percentage of active ingredients such as 5-20-20. These are the most common types of designations of farm fertilizer blends even now and these mixtures are prepared at various fertilizer blending plants by comminuting the various basic materials that go into these combinations and then blending them together to form a more or less uniform mixture of the granular fertilizer. Even these mixtures do not have particles of uniform size or weight. As agriculture has advanced even further, herbicides have been compounded in granular form and, depending upon the manufacturer and industry standards, these particulates tend to also have different sizes and weights. Furthermore, soil conditioners such as gypsum and Ph adjusters such as powdered lime, are also sometimes blended in with the basic fertilizer - herbicide mix.

In short, modern agriculture uses a great variety of particulates that must be applied as uniformly as possible to the field to be cultivated.

The difficulty of spreading what is basically a non-uniform mixture, in a uniform manner, over vast acreages has both fascinated and confounded agricultural equipment manufacturers for many years.

An early solution was proposed by Biszantz, as shown in U.S. Pat. No. 2,538,961, wherein a series of paddles were connected to transversely disposed chains inside a trough, all of which overlaid a diagonally cut table, and material was distributed transversely of the hopper truck as the truck moved across the field. The particular system had two significant drawbacks, the first being that the top flight of paddles attached to the conveyor moved the material outwardly before it could commence its fall past the tapered table, and as it commenced that fall, it was further impacted by the lower returning conveyor belt beneath the tapered table, all of which tended to make non-uniform the already non-uniform mixture, and further, because the granular material thus deposited upon the agricultural fields left a wide center strip behind the spreader truck that was not covered with the granular material. These two factors, namely the non-uniformity of spreading of the material, and the uncovered center strip behind the spreader truck, both combined to render this particular construction unsatisfactory and, in fact, even though it was patented in 1951, it never has come into widespread use in the agricultural community.

Another device used by fertilizer spreader trucks has been the rotating fan such as shown in Hurt, U.S. Pat. No. 2,947,544, which, simply stated, permits the granular material to fall upon a rotating table with vanes disposed thereabove, and the vanes impart a peripheral momentum to such material, and it is dispersed widely to either side and behind the truck to cover the area that the truck has traversed. This is probably the most common expedient used today, not just the Hurt device, but devices of that general rotating table type.

Other expedients have been proposed, as for example in Hamnes, U.S. Pat. No. 3,756,509, which shows tranversely disposed troughs having screw conveyors therein which convey material from a central hopper outwardly, with a uniform drop being attempted by means of spaced openings in the bottom of the trough. This type of device is both costly and subject to "gumming up" and has not found widespread acceptance in the agricultural field.

Probably the closest approach to a satisfactory solution to the problem of accomplishing a uniform distribution of a non-uniform mixture of agricultural fertilizers and chemicals over a fairly wide area behind a fertilizer spreader truck has been proposed in the patent to Palmer, U.S. Pat. No. 3,780,955. In this patent a material drops from the back of the fertilizer hopper onto the spreader apparatus which divides the material into a predetermined number of equal but separate streams. A spreader belt is projected transversely from one side of the vehicle body which is then divided transversely into sections corresponding in number to one-half of the material streams mentioned above. Each of the material streams thus formed is channeled to a corresponding transverse section on a spreader belt, after which the material is leveled to a uniform depth over the complete width of the spreader belt. The material is then progressively discharged to the ground at a constant rate in one direction transversely of a spreader belt and over the longitudinal length of such belt. Then another belt is disposed transversely of the vehicle body in the opposite direction and the mode of spreading mentioned is duplicated. The apparatus described in Palmer is shown as prior art at FIG. 1 and FIG. 2 of the drawings of this application, and the two principal drawbacks of this system are that the material thus spread must fall both through the top conveyor chain, which moves it outwardly for distribution, and then past a discharge regulating table, or device of some sort, and then again through the lower level returning chain. The second drawback, and the major one that has been present in the prior art from at least the time of the patent to Biszantz issued in 1951, is that the Palmer spreader leaves a large dead area (clearly shown in FIG. 2) behind the spreader truck where no material is deposited at all. It is totally unacceptable to retraverse the area that has been missed because it would "double" the materials already applied to the surrounding soil and would gain very undesirable results. This is a problem that has not been overcome by this type of fertilizer spreader device, and that is the principal reason that the rotating vane spreader device, shown in Hurt mentioned above, has been and remains to this day the common method of spreading agricultural particulates used in crop production on the farm fields of America.

SUMMARY OF THE INVENTION

The particulate spreader apparatus proposed herein is readily attachable and detachable to the rear portion of a fertilizer hopper truck as currently in use, and is simply comprised of a pair of trough housing chain conveyor belts disposed in overlapping relationship, as respects the rear portion of the fertilizer spreader truck, and extending outwardly in opposite directions to their extremities, with such conveyors being disposed beneath the hopper discharge opening such that they both pick up substantially an equal amount of the material discharged from the hopper and move it outwardly inside an apertured trough which permits a uniform amount of the non-uniform mixture to fall to the ground behind the truck from the center of the truck outwardly to the ends of the conveyor belts. It should be noted that the material being spread falls on the lower conveyor belt which is underlaid by a discharge rate adjustment structure, which can be a trough with a slotted bottom as shown, or some other type of discharge regulating device.

DETAILED DESCRIPTION OF THE INVENTION

Figure 1:
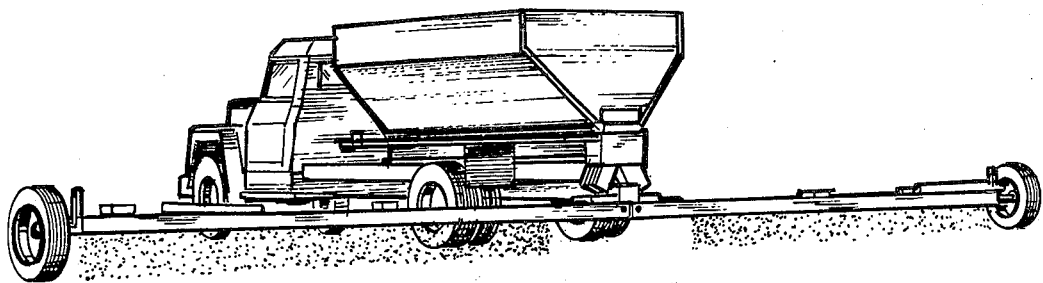
FIG. 1 is a perspective view of a fertilizer truck with the spreader device of Palmer, as disclosed in U.S. Pat. No. 3,780,955, attached thereto.
Figure 2:
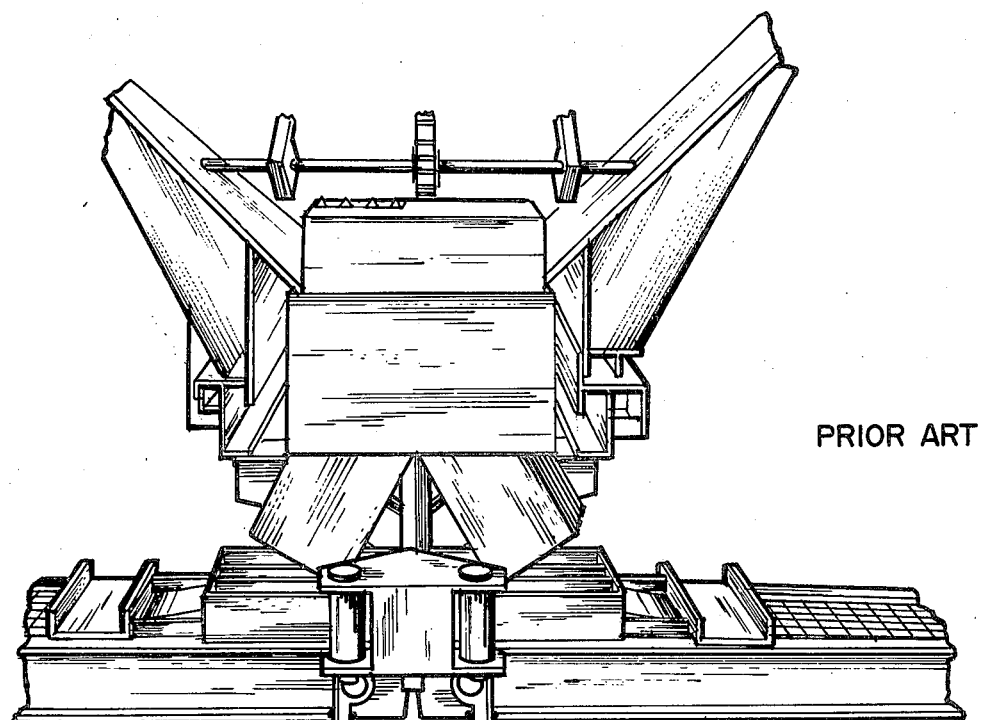
FIG. 2 is a partial perspective view of the rear portion of the vehicle shown in FIG. 1 with the same spreader apparatus attached, and particularly shows the discharge that falls upon the top spreader chain and then shows that the material does not commence dropping upon the surface of the ground until it is well outboard of the center of the truck, leaving a large untreated strip behind the direction of vehicle movement.
Figure 5:
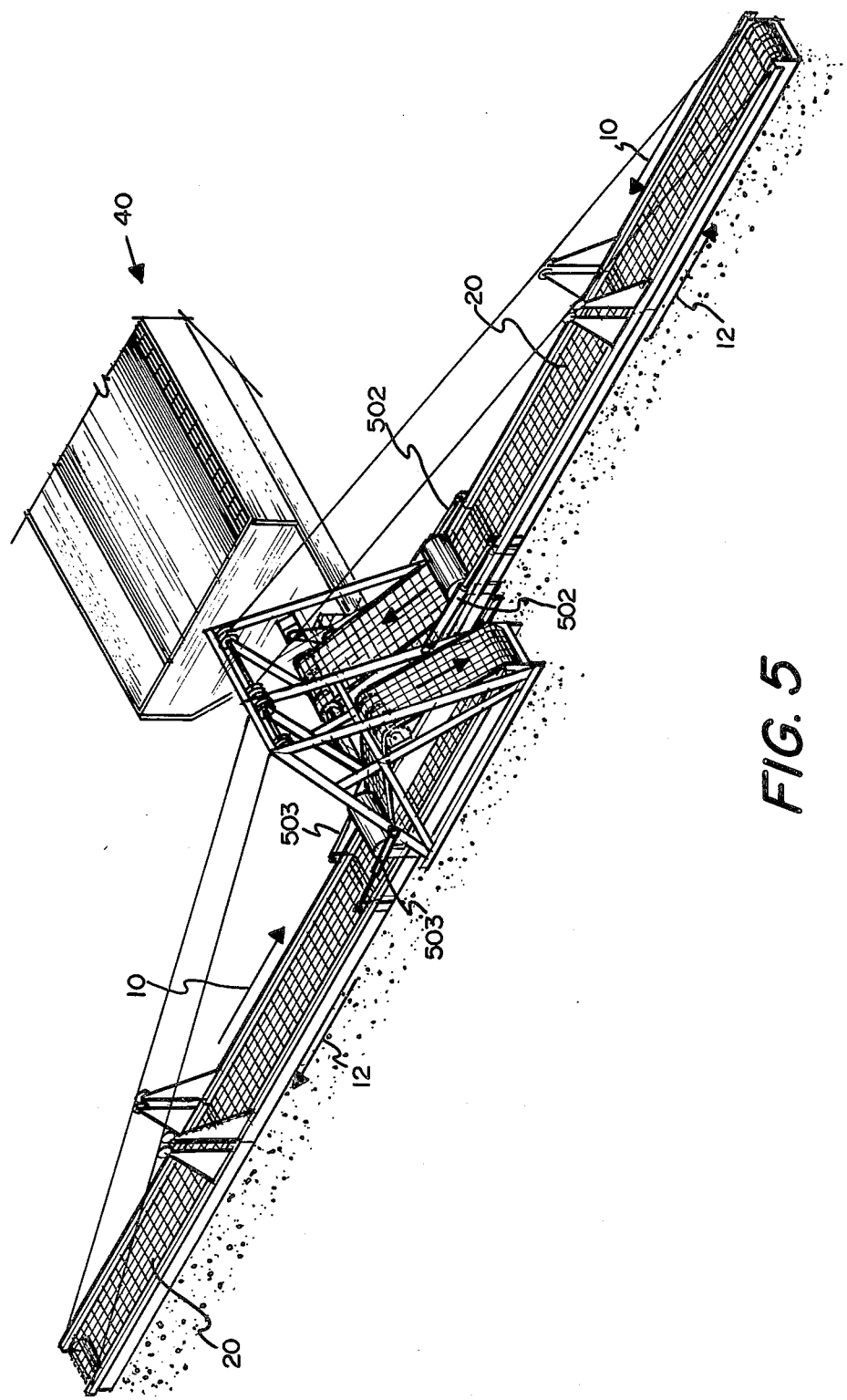
FIG. 5 is a perspective view of the present invention in fully deployed position.
Figure 7:
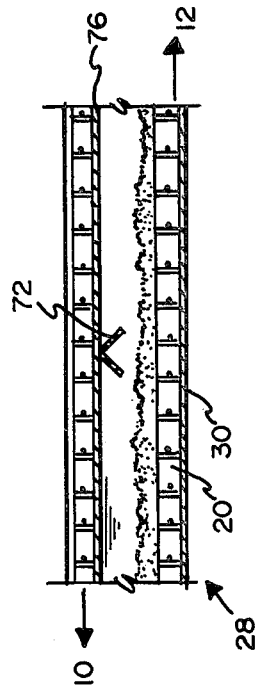
FIG. 7 is a cross-sectional view of the conveyor unit taken in a direction transverse to the center line of the truck along lines 7—7 as shown in FIG. 5.

The granular spreading apparatus of this invention is shown in perspective in FIG. 5. It will be noted that the spreader shown in FIG. 2 (prior art) drops the material from the fertilizer spreader hopper through a series of chutes into a corresponding series of chutes which then fall down a small flapper or guide onto the top conveyor chain from whence they drop onto a tapered table (not shown) and from thence through the bottom returning conveyor chain onto the ground. Applicant shows in FIG. 3 the direction of chain movement by arrows 10 (inbound) and 12 (outbound). In applicant's device (shown in FIG. 3) the granular material initially falls onto the lower conveyor chain 20 from whence it is conveyed outwardly in between the chain segments (as shown in FIG. 7) and it progressively drops through the trough floor as a diagonal slot 19 opens beneath the conveyor chain 20.

Figure 6:
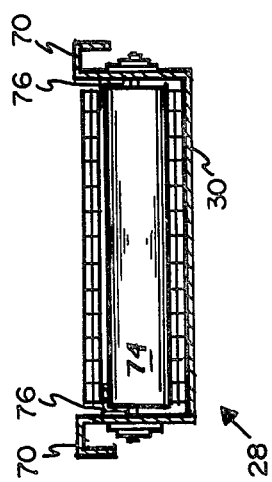
FIG. 6 is a cross-sectional view taken along line 6—6 in FIG. 5.

The granulated material falls off the conveyor chain contained within the fertilizer hopper truck 40 in substantially equal amounts on the conveyor chain 50 (disposed to the right as shown in FIG. 5) and the conveyor chain 60 (disposed to the left in FIG. 5). As soon as these granular materials are deposited upon the conveyor chain travelling to the right (as shown in FIG. 5, and to the left as shown also in FIG. 5) the material progressively begins to fall directly to the ground through the gap created by the slot 19 that underlies the bottom portion of the conveyor chain disposed thereabove. FIG. 7 shows how the body of material to be distributed is moved to the outboard end of the trough and it will appreciated that the granular material commences to fall when it passes above slot 19 which is defined in the present invention between two triangular trough bottom portions 30, one of which has its base at the inboard end of the trough and the other of which has its base at the outer end of said trough. The trough is comprised of a pair of side supports 70 (as shown in FIG. 6) tied together with cross brackets 72 and held at each end by rollers 74, and the top chain is supported in its return position by brackets 76 disposed beneath the top chain and attached to side brackets 70.

The spreader is driven by a hydraulic motor 200 so that the conveyor drag chains 20 are synchronized with the hopper unloading belt 210 which is driven by hydraulic motor 240. The spreader conveyor belt 215 is driven by the truck conveyor roller 216 through shaft 217 to sprocket 218 connected by chain 219 to sprocket 220 which drives the conveyor roller 221 which is also mounted on common shaft 222. Synchronization of the chain speed is accomplished by hydraulically connecting spreader drag chain motor 200 in series with the hopper unloading belt motor 240. This series connection routes hydraulic oil through the hopper belt drive motor 240 and then through the spreader chain motor 200 so that the oil flow causing the hopper belt motor to drive also drives the spreader chain motor. Synchronization of these motors is desirable because the truck hopper unload drive is equipped with an automatic speed sensitive device (not shown) which causes the hopper to unload at an even rate independent of truck speed. In other words, as the truck speeds up, the hopper unloads faster, or as the truck slows down, the hopper unloads slower, so that the rate of application of fertilizer stays constant even if the truck speed varies. Connecting the spreader chain drive motor in series causes steady rate distribution of material in the conveying troughs 28 regardless of vehicle speed.

Figure 4:
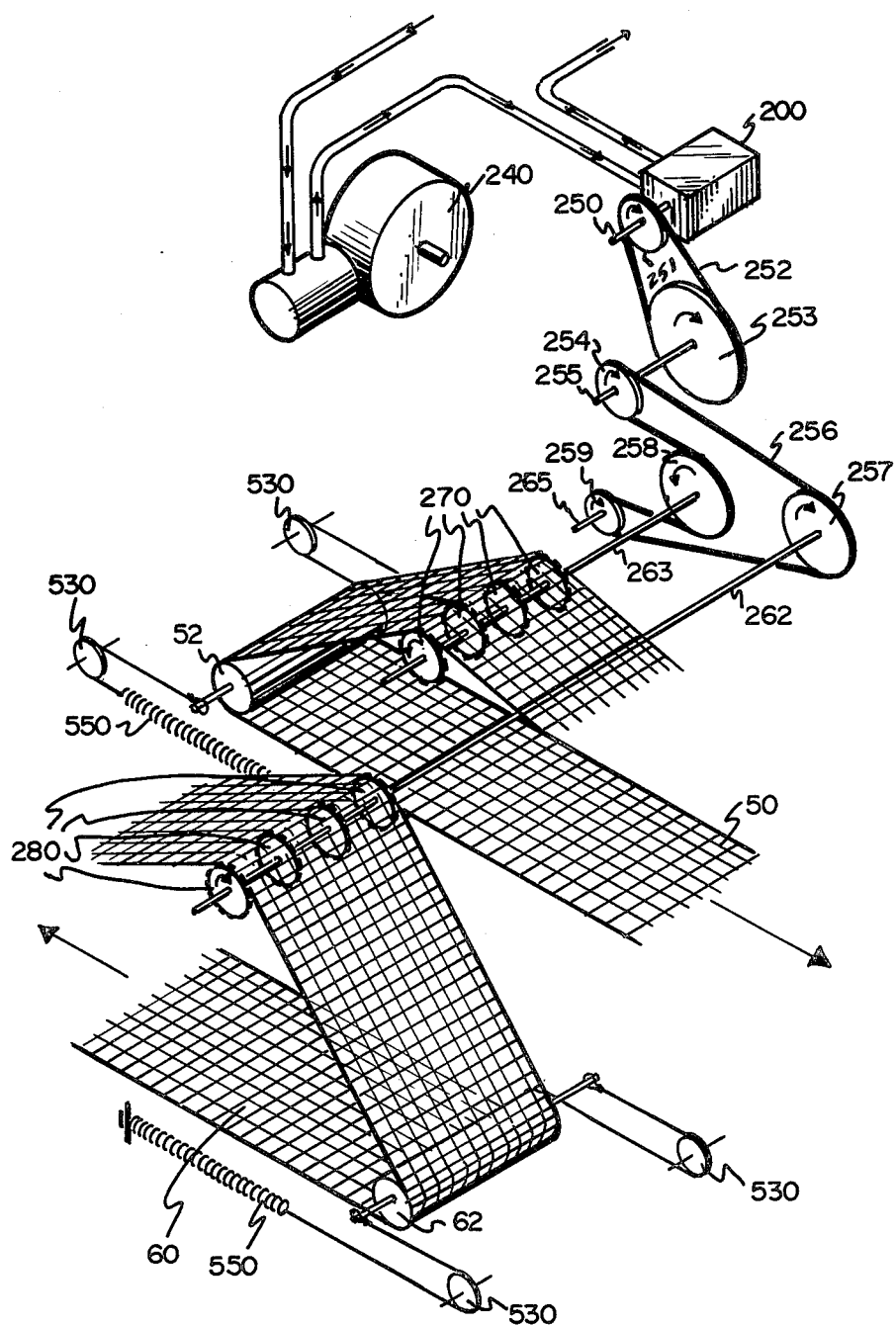
FIG. 4 is a perspective view of the belt drive mechanism of the present invention.

The chain and sprocket belt drive mechanism is shown schematically in FIG. 4. The system shown is merely a convenient means of creating the necessary speed reduction between the hydraulic motor and the drag chains and is not a limitation of this invention. In production, a gear box may be used to accomplish the same result. It will be seen that motor 200 drive shaft 250 in a clockwise direction, thereby rotating drive sprocket 251 clockwise. Chain 252 drives sprockets 253 and 254 (mounted on common shaft 255) clockwise. Then chain 256 wound around sprockets 257, 258 and 259 mounted on shafts 262, 263 and 265, respectively, to produce synchronized clockwise rotation of shaft 262 and counterclockwise rotation of shaft 263, as shown. This rotational motion is then transmitted through shafts 262 and 263, whereby chain drive sprockets 270 and 280 are rotated thereby driving chains 50 and 60 respectively. The chains then pass over rollers 52 (going to the right) and 62 (going to the left).

Figure 3:
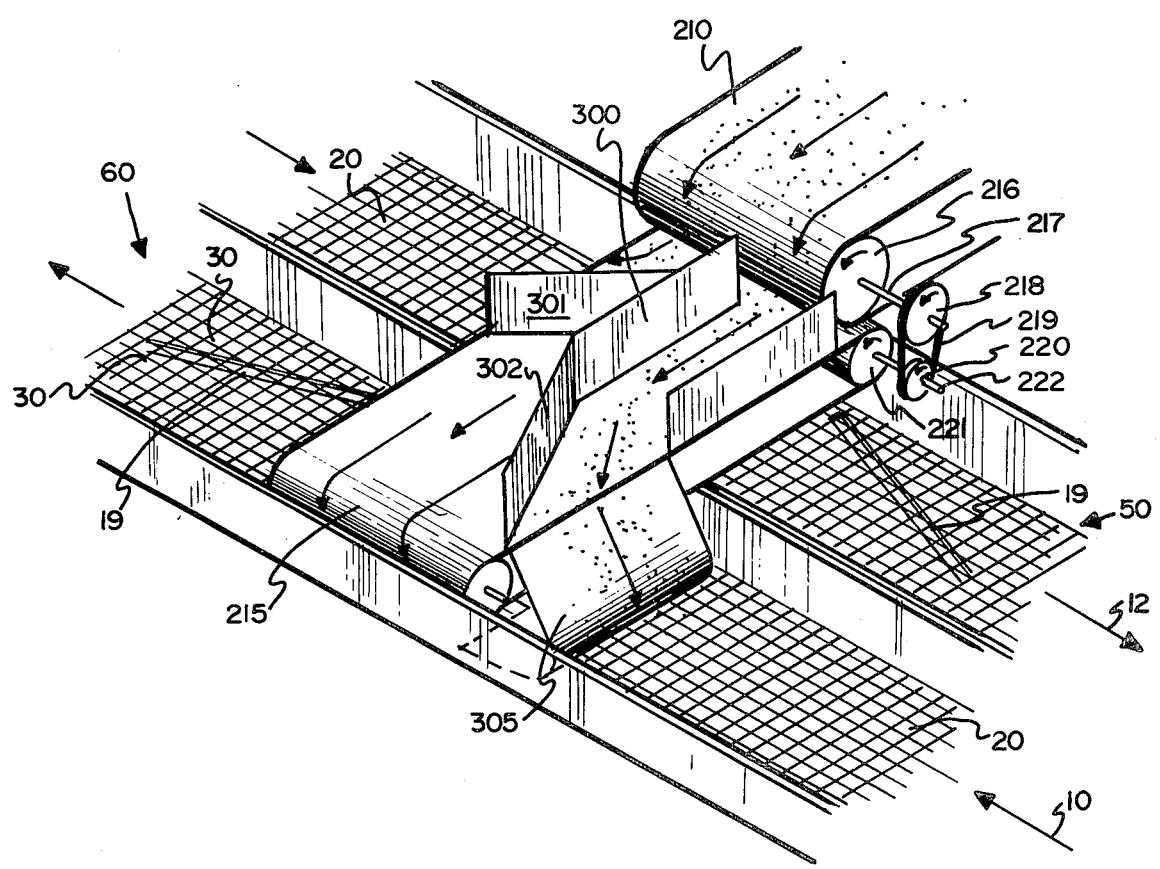
FIG. 3 is a perspective view of the dual chain troughs and spreader belts of the present invention attached to the rear bed portion of a fertilizer spreader truck.

In operation, shown in FIG. 3, material falls from conveyor belt 210, onto belt 215 and the material is divided by vane 300, which includes a wing 301, which divides about one-half of the material flow to the trough 50, and the other one-half of the material is channelled to trough 60. A combined discharge slide and flexible leveller 305 (one on each side) levels the material as it passes thereunder and is conveyed away for deposit on the field being treated.

Figure 8:
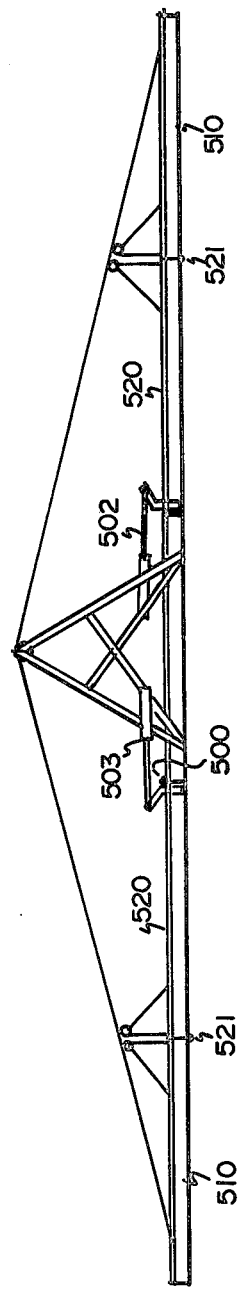
FIG. 8 is a schematic view of the device with the troughs disposed in operative position.
Figure 9:
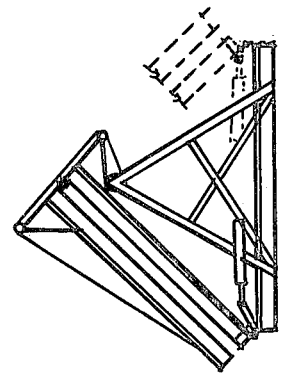
FIG. 9 shows the troughs disposed in their folded transport position.

Another feature of this invention is its ease of transport from one work area to another. This transport function is a accomplished by the cable and cylinder arrangement shown in FIGS. 5 and 8, wherein the troughs are each pivoted about a point 500 and actuated up and down by pairs of hydraulic cylinders 502 and 503. The folded positions of the troughs are shown in FIG. 9, and it will be seen that each trough has an outboard section 510 and an inboard section 520, each section being pivoted at point 521.

The cylinders, 502 and 503, when actuated, fold up the wing sections 520 while the support cables, tensioned through the cable guides, allow wing sections 510 to fold down to nest against sections 520. As the wings fold, take up springs 550 (shown in FIG. 4) acting with idler sprockets 530, actuate to keep the conveyor chains tensioned in both the folded and deployed positions.

The apparatus described above is simple in operation and self-cleaning in that the material being conveyed falls directly upon the lower chain above the flow control means (the slotted trough disposed below the lower chain) and, when the material has been exhausted, the chain travels upwardly around the end roller and is perfectly clean and returns back to the center of the fertilizer truck where it again is reintroduced as the bottom chain and again conveys another load of granular material to the outboard extremity of the spreader arm. As clearly appears in FIG. 5, the granular material from about the center line of the truck and going to the right, drops to the ground from the right hand conveyor and the material being conveyed to the left of the truck drops to the ground on the rearward conveyor from about the center of the truck and on out to the outboard extremity of the left disposed conveyor chain. The ground coverage resulting is therefore uniform and without gap, and because the material has not been subjected to falling through two sets of conveyor chains it is distributed from the spreader arms in substantially the same admixed condition from which it was received from the body of the fertilizer hopper truck. The embodiment described above is the preferred embodiment, but obvious changes and modifications apparent to one skilled in the art are intended to be included within the scope of the appended claims.

I claim:

1. A granular material spreading apparatus for attachment to a vehicle having a hopper mounted thereupon, and including a hopper discharge outlet and an endless conveyor belt and truck belt drive means for conveying granulated material and having;

a pair of troughs attachable transversely of the said vehicle, said troughs each having opposed sidewalls, a bottom wall with at least one discharge opening therein, with each of said troughs having said at least one discharge opening commencing about at the centerline of said vehicle body with said opening extending from about the centerline of said vehicle body to about the outer extremity of said trough; and a flat endless spreader belt of an open construction having a lower run moveable above said trough bottom wall outwardly from the centerline of said vehicle body to the extremity of said trough, longitudinally of said trough; and a material distributing unit mounted on said vehicle and distributing substantially equal portions of particulate matter to be spread to each of said troughs, one of which troughs is extended transversely to the right of said vehicle body, and the other of said troughs being extended transversely to the left of said vehicle body, the inner ends of said troughs being in overlapping relationship at the transverse center line of said vehicle whereby material is discharged from said vehicle into said pair of troughs at about the centerline of said vehicle.

2. The spreader according to claim 1 in which:

the said flat spreader belt is disposed immediately above the bottom wall of said trough, and said bottom wall having a slot therein extending from one side of the trough at a point about the center line of said vehicle body to the other side of the trough at a point at about the extremity of each of said troughs.

3. The troughs according to claim 1 in which said bottom wall is comprised of a pair of generally triangular shaped portions with one portion having its base disposed near the center line of said vehicle body with its hypotenuse extending toward the outer extremity of said trough, and the other of said portions being reversed.

4. The trough according to claim 3 in which at least one of said triangular shaped bottom portions also includes apertures therein spaced to obtain a desired dispensing pattern of particulate matter conveyed above said bottom by said spreader belt.

5. A material distributing apparatus including a wheeled receptacle for said material having a rearwardly directed outlet, a pair of material dispensing troughs, said troughs extending laterally of said vehicle body and in opposite directions from beneath said discharge chute, with overlapping inner ends, pivoted connections between said vehicle body and said troughs for the upward and inward swinging of said troughs into positions of non-use, said troughs being of open frame construction, an endless sprocket chain operatively mounted lengthwise and within each trough, a pair of triangular trough bottom portions, with their bases at opposite ends of the trough and sized to have a slot therebetween, said portions being within the confines of each trough directly beneath the bottom run of said chain therein, said chain being operated so that the bottom run is conveyed from a point at about the centerline of said vehicle body to a point at about the outer end of said trough whereby material dropping onto the conveyor chain is moved outward as said material falls through said slot in a substanially uniform manner from about the centerline of said vehicle body to a point at about the outer extremity of each of said troughs.

6. The material spreading apparatus according to claim 1 which includes hydraulic pump belt drive means interconnected in series between the said truck drive belt means and the said flat endless conveyor belt, whereby a change in speed of the truck conveyor belt is proportionately reflected in the speed of the flat conveyor belt.

\* \* \* \* \*